Dec. 10, 1968   C. F. GULLICKSON   3,415,152
MUSIC TEACHING AID

Filed May 17, 1966   7 Sheets-Sheet 1

Fig. 1

INVENTOR.
Cecil F. Gullickson
BY Roger L. Martin

ATTORNEY

Fig. 2

Dec. 10, 1968  C. F. GULLICKSON  3,415,152
MUSIC TEACHING AID

Filed May 17, 1966  7 Sheets-Sheet 4

Fig. 2a

INVENTOR.
Cecil F Gullickson
BY Roger L. Martin
ATTORNEY

Dec. 10, 1968     C. F. GULLICKSON     3,415,152
MUSIC TEACHING AID

Filed May 17, 1966     7 Sheets-Sheet 5

INVENTOR.
Cecil F. Gullickson
BY Roger L. Martin

ATTORNEY

Dec. 10, 1968　　　C. F. GULLICKSON　　　3,415,152
MUSIC TEACHING AID

Filed May 17, 1966　　　7 Sheets-Sheet 6

Fig. 7

INVENTOR.
Cecil F. Gullickson
BY Roger L. Martin
ATTORNEY

Fig.7a

United States Patent Office 3,415,152
Patented Dec. 10, 1968

3,415,152
MUSIC TEACHING AID
Cecil F. Gullickson, 2018 Fosgate Drive,
Winter Park, Fla. 32789
Filed May 17, 1966, Ser. No. 550,820
11 Claims. (Cl. 84—478)

ABSTRACT OF THE DISCLOSURE

This application contains a technical disclosure of a musical device by which the notes of musical chords of all the common types and having harmonious relation to each of the twelve root notes of a musical scale may be indicated on an indicator light assembly. This device is disclosed as consisting of a switching mechanism having two sets of selectors, by one set of which any one of a type of musical chord which it is desired sohuld be indicated may be selected, and by the other set of which, any one of the twelve root notes for which the type of chord is desired may be selected. Electrical circuitry connects the switching mechanism to the indicator light assembly whereby the notes which compose the chord of the selected chord type, for the selected root note, are indicated. Such a musical device thus becomes an effective music teaching device by presenting a display of each of the various note compositions which either make up all of the common chords or one selected type for each of the twelve root notes, or make up all of the common chords of each type for a selected root note. Such a device also assists experienced musicians in selecting harmonious variations of melodies which they may be playing, or in composing such variations.

---

This invention relates to a chord indicating device and more particularly to one which is used to indicate the proper combination of keys to be depressed in a bass octave of a piano type manual such as the manual of an organ or piano.

A general object of the invention is to provide an improved chord indicator for use with piano type manuals.

Another object is to provide a chord indicator of the type contemplated and which is simple to operate and which better emphasizes the relationships between the various types of chords and the various chord notes.

Yet another object is to provide a chord indicator that utilizes lights for indicating the keys to be depressed and which enables the student to establish energizable circuitry associated with a particular type of chord and thereafter by the selective actuation of certain switch components to visually examine the relationships between chords of hte same type but which have different roots.

Another object is to provide a switching mechanism for a chord indicator of the kind contemplated and which enables the music student to separate and select the type of chord and its root.

Another object is to provide a chord indicator which is much more easily manipulated by the music student in selecting a chord indication than other indicators known in the art.

In accordance with the invention, appropriately positioned lights are used to indicate the keys involved in playing a selected chord and separate means are provided for the student to select the type of chord to be indicated and to select the root thereof.

One aspect is related to a novel switching mechanism for use in energizing the proper lights and which involves a novel means for selecting energizable circuits that are associated with different types of chords and for energizing such circuits.

The novel features which are believed to be characteristic of this invention are set forth with particularity in the appended claims. The invention itself however, both as to its organization and methods of operation, together with further objects and advantages thereof, may best be understood by reference to the following description taken in connection with the accompanying drawings wherein:

FIG. 2 and FIG. 2a are section views along the lines 2—2 of FIG. 1 and 1a; FIG. 2 is a top view of the light assembly showing its relation to the keys in a bass octave of the manual, while

FIG. 3 is a vertical section view through the switching mechanism as seen along the lines 3—3 of FIG. 1a;

FIG. 4 is a vertical section view at one end of a rotor component of the switching mechanism and shows adjacent structure including a spring mechanism used in orienting the switch contacts carried by the rotor, the view being taken along the lines 4—4 of FIG. 2a;

Now with respect to the drawings, the chord indicator is generally shown at 10 as mounted on the face plate 11 of a piano 12 having a conventional manual or keyboard 13. It includes a light assembly designated at 14 and a switch mechanism 15 which are connected in a circuit arrangement 16 shown in FIGS. 7 and 7a.

Figure 2:
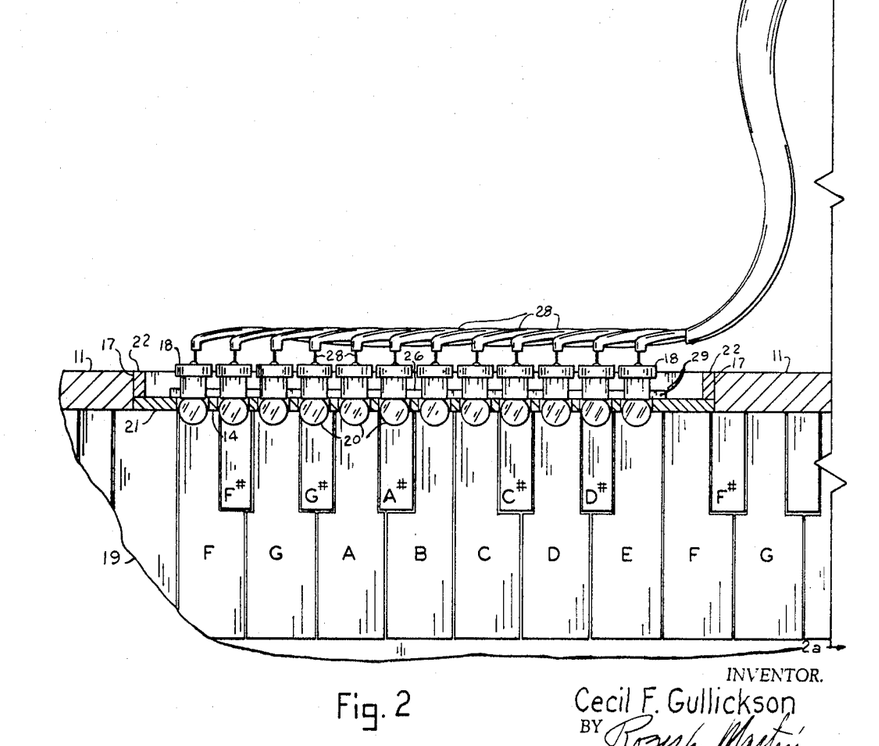

The face plate 11 has a rectangular cutout 17 immediately above the keys of a bass octave below middle C and an indicator light assembly 14 is mounted generally in the cutout 17. Each light 18 in the assembly is associated with one of the keys 19 in the octave and may be positioned immediately above the key so that when it is lit it serves as an indicator of the key for the student to strike as one of the keys of the desired chord. Alternatively indicia may be inscribed on the front panel 21 in proximity to each of the lights 18 or lights 18 can be arranged in various places in the proximity of the manual to indicate the proper keys 19, and the bulbs 20, although shown exposed in FIG. 2 of the drawings, may be shielded behind translucent or transparent fixtures adjacent the keys or may in fact be placed below the appropriate keys if translucent or transparent material is used in the structure of the individual key.

In the embodiment illustrated, the light assembly is mounted on a rectangular panel structure 21 that is designed to fit in the cutout 17. This rectangular front panel is provided with a row of circular apertures arranged to accommodate the sockets for the light bulbs 20 and which are appropriately spaced so that each bulb is immediately above the key that it indicates when the light is lit. Upright end pieces 22 are located at the opposite ends of the panel structure and these pieces are fastened to the front panel by screws 23. A fourth piece of the panel structure is designated at 24 and this piece extends across the bottom of the cutout 17 behind the front panel.

This bottom piece is fastened to the end pieces 22 by suitable fasteners not shown.

The indicator light assembly 14 may be fastened in the cutout by various methods. In the embodiment shown the end pieces 22 are glued in the cutout 17 to position the panel structure in place; thereafter the front panel of the structure is easily removable by removing the screws when access to the assembly is desired.

The panel structure of the indicator light assembly is made of a nonconductive material such as plastic, wood, etc. to provide the insulation necessary for the various electrical circuit components thereof.

Figure 7:
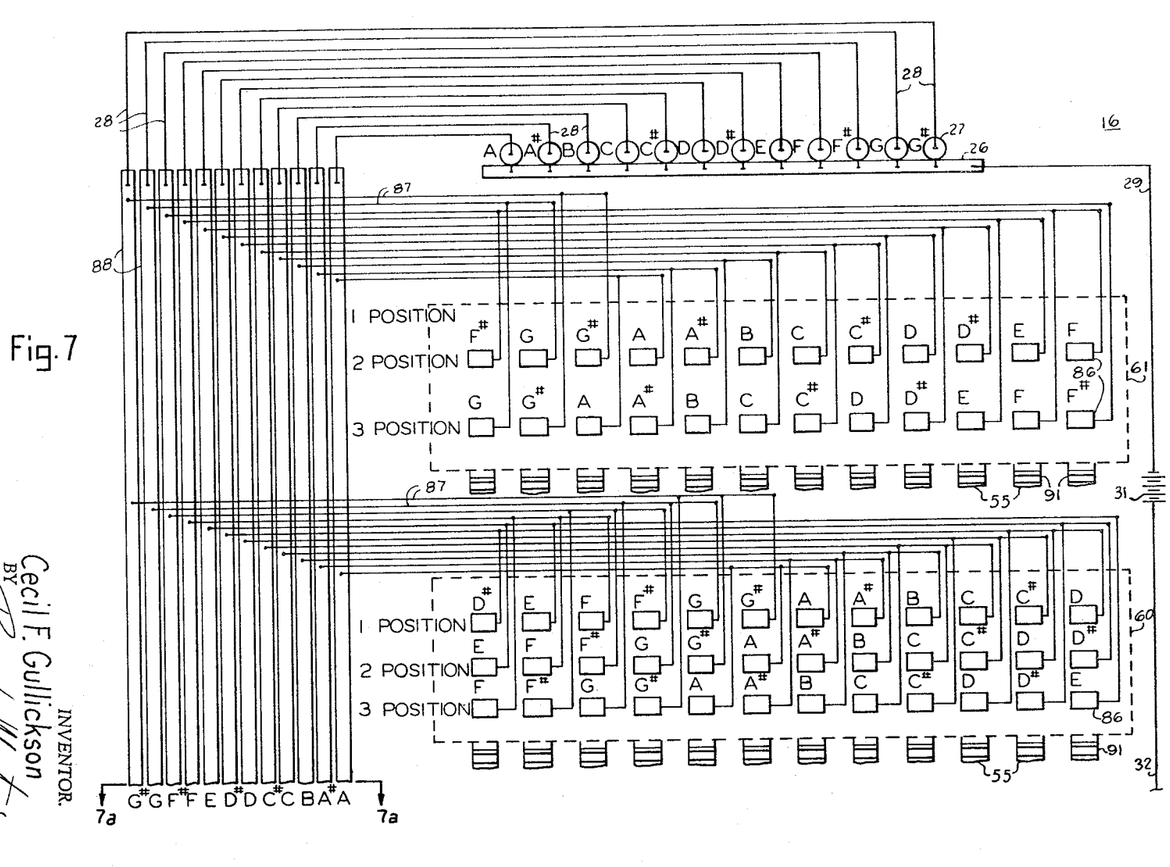
FIG. 7 and 7a are diagrammatic illustrations of the circuit arrangement.

The indicator light assembly 14 includes an elongated bus bar 26 made from conductive material that is fastened to the back face of the panel 21 and positioned to both support sockets 27 and to make electrical contact with the sides of these sockets, into which bulbs 20 are to be inserted. The sockets 27 may be screw type or pin type sockets as may be desired for the type of bulbs used as indicator lights. Each socket 27 has an end cap which provides a suitable electrical contact to electrically connect the bulbs in the circuit system. From each cap, electrical leads 28 are brought out of the indicator light assembly in the form of a cable 30 which leads to the switch mechanism structure 15. From the bus bar 26, the electrical lead 29 is brought out of the indicator light assembly and is connected to a power source 31 which, in one embodiment as shown in FIG. 7, may be a battery. It is understood of course that this power source may be of any conventional type, AC or DC; e.g. the choice of the power source may depend on the type of bulbs 20 to be used in the chord indicator. From power source 31 an electrical lead 32 is connected to switching mechanism 15 in a manner to be described hereinafter.

Having described the structure of the indicator light assembly 14 in detail, there shall now be described in some detail the manner in which the chord indicator may be utilized in the study and/or playing of music, before proceeding with the detailed description of the structure of the switching mechanism.

As is well known to those skilled in the art, much music is written as a single melody line in the treble clef. In the playing of various keyboard type musical instruments it is possible to play a number of notes simultaneously with the melody notes using the fingers of both hands (e.g. with a piano), or both fingers and feet (e.g. with an organ). It is important that proper combinations of notes be chosen in order that the resultant music is melodious and harmonious. The proper combinations of notes, known and referred to as chords, to be played in association with a melody note, known and referred to as a root note, are well known to those who have studied music. Such musicians, in playing music, use numerous chords chosen to harmonically relate to the root notes of the music which they are playing.

Frequently, music which is written as a single melody line in the treble clef also contains indications above the root notes of the chords which harmonically relate to this root note and which may be played therewith. In such cases the chords are designated by names or symbols and accordingly the musician must know what combination of keys must be played to form the specified chord. It is known that, for each root note, there are as many as ten to fifteen commonly used chords which may be played in association with the root note in a harmonious relationship. For example, for each root note of the twelve notes in an octave (A, A♯, B, C, C♯, etc.) there are harmonious combinations of notes which form a Major chord, a Minor chord, an Augmented chord, a Common Seventh chord, a Diminished chord, a Major Sixth and so on.

As a more specific example, when the melody or root note is C, a Major chord would be composed of the three notes, C. E, and G. A Minor chord for the root note C would be composed of the notes C, E Flat, and G. An Augmented chord for the root note C would be the notes C, E, and G♯, while the Common Seventh for the root note C would be C, E, G, and B Flat. For the same root note, the Diminished chord would be C, E Flat, G Flat, and A. Similarly, a Major Sixth chord would be composed of the notes C, E, G and A. The composition of a number of other frequently used harmonic chords for the root note C need not be set forth here since this is well known to those who are skilled in the art. However, as will be later described in connection with Table No. I, the twelve notes of any root note scale may be considered steps I, I♯, II, II♯, III, IV, etc. thru VII (and above the scale of VIII, VIII♯, IX, etc.), and certain combinations of these steps, as shown in Table No. I, form the various types of harmonic chords in relation to the root note of each scale.

As has been indicated, there are similar harmonic chords for each of the twelve root notes of an octave but the composition for each of these chords differs depending upon the root note. In comparison with the chord compositions indicated above for the root note C, the Major chord for the root note F♯ would be composed of the notes F♯, A♯, and C♯ while the Major chord for the root note A would be composed of the notes A, C♯, and E. Likewise the Augmented chord for the root note F♯ would be the notes F♯, A♯ and D, while for the root note A, this chord would be composed of the notes A, C♯ and F. A Major Sixth chord for the root note F♯ would be composed of the notes F♯, A♯, C♯, and D♯, while, for the root note A, the Major Sixth chord would be composed of the notes A, C♯, E and F♯.

While the composition of the chords, as set forth above, has shown the root note as the first note of each chord, musicians frequently use harmonious chord inversions in which the notes of a chord are rearranged. For example, the Major Sixth chord for the root note A, just referenced, might be played, on a keyboard, as C♯, E, F♯ and A, or as E, F♯, A and C, or as F♯, A, C♯ and E, thus extending the chord into different octaves. But, as is known to those skilled in the art, such rearrangement does not alter the type of chord. For purposes of describing this invention, all such arrangements are embraced in the disclosure of a single octave of twelve notes corresponding to the twelve lights of the indicator light assembly illustrated, and corresponding notes in octaves higher and lower than the octave above which the single octave indicator light assembly is positioned, may be played or more than one octave of lights may be included in the indicator light assembly, all within the teachings of this invention.

From the above it will be apparent that there are numerous chord compositions which must be known to a musician and which he must learn in order that the correct chord can be chosen for each root note of the melody which he is playing. The invention herein described shows the musician, whether he be only a student or an experienced player, the notes which make up the chord which he desires for any root note which he wishes to play. The composition of the desired chord is shown by the lights in the indicator light assembly 14. By utilizing the switch mechanism 15, the structure of which will next be described in detail, the musician may select the chord type which he desires to play and may also select the root note for which he wishes the desired chord indicated, as a result of which the desired chord is indicated on the indicator light assembly. Thus the beginning music student, by repeated selection of various types of chords, as designated on the face of the switch mechanism, and by selection of any of the twelve root notes similarly designated on the face of the switch mechanism, can be repeatedly shown, by the indicator light assembly, those notes which compose the selected chord, and in this manner the music student may rapidly learn the composition of such chords for any and all of the root notes. For the more experienced musician, similar selection of the type of chords desired for the various root notes will result in a rapid indication of the correct chord composition by the indicator light assembly, thus facilitating the playing of melodious musical compositions and permitting the rapid selection of various types of chords, making possible many variations of harmonious combinations with resultant more melodious musical compositions.

Having thus described the manner in which the musician makes advantageous use of the chord indicating device in accordance with the teachings of this invention, the structure of the switching mechanism, whereby the various types of chords are selected and the root notes are separately selected, will next be described.

Figure 1:
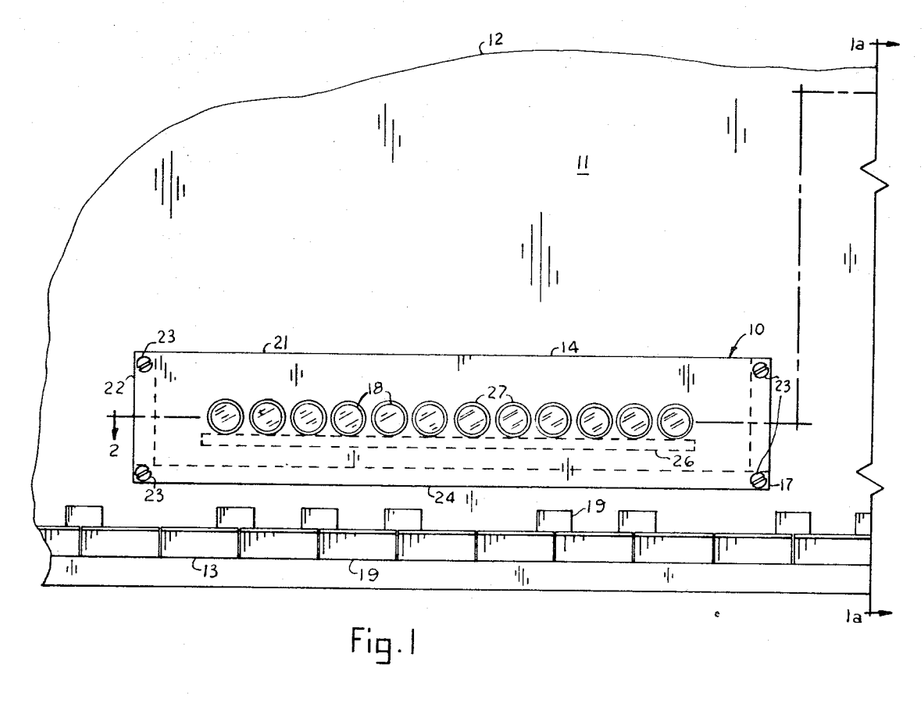
FIG. 1 and FIG. 1a are front views of a fragment of a piano embodying the invention and show a portion of the manual or keyboard thereof.
Figure 1A:
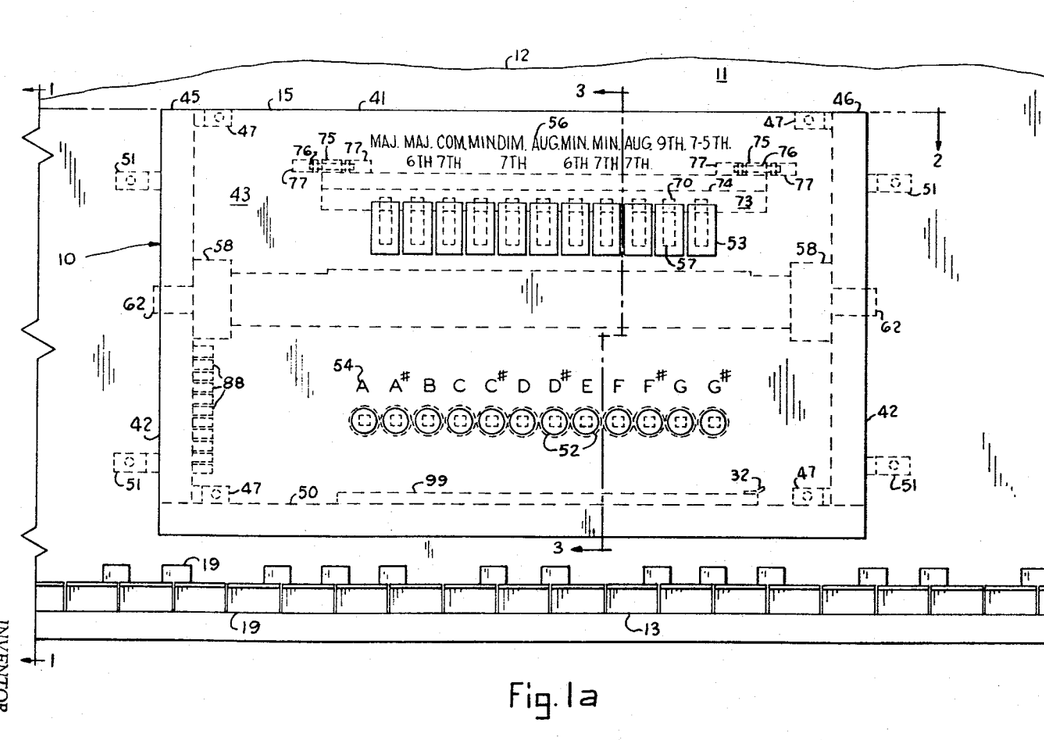

The switch mechanism 15 is mounted in a housing 41 which in turn is also supported on the vertical face plate 11 of the piano or organ 12, as shown in FIG. 1a. For purposes of mounting the switching mechanism 15 in a convenient place for the musician to actuate the selector switches, the face plate 11 of the piano or organ 12 is provided with a second rectangular cutout 42 immediately above the keys of a treble octave above middle C and the switching mechanism, having a front panel 43, a rear panel 44, and side wall forming panels 45 and 46, is positioned in this cutout with the front panel 43 vertical and in the same plane with the face plate 11 and the rectangular panel structure 21 of the indicator light assembly 14. The rear panel 44 is offset rearwardly from the front panel and the two side wall panels 45 and 46 are connected to the front panel by internal corner braces 47 that are appropriately spaced and secured in place by screws designated at 48. Externally located L-shaped corner braces 49 are used in connecting the rear panel 44 to the side wall panels 45 and 46 of the housing in order to facilitate assembling the switching mechanism. The bottom wall 50 of the housing lies on the lower edge of the rectangular cutout 42 (see FIG. 3) and is fastened to the upright side walls by suitable means not shown. L-shaped brackets 51 which are appropriately spaced and fixed to the side walls and to the face plate 11 of the piano or organ 12 are used to releasably fasten the housing in place. The components of the housing are made of a nonconductive material, such as plastic, wood, etc. to provide the insulation necessary between the various electrical circuit components which will be described hereinafter.

Positioned upon the front panel 43 of the switching mechanism 15 are two parallel horizontal rows of switch actuators, 52 and 53. The lower row 52 consists of 12 actuators each having, in the illustrated embodiment, cylindrical knobs protruding forwardly from the plane of the front panel 43 and spaced in the front panel such that the twelve cylindrical knob switch actuators are positioned immediately above the twelve keys of a treble octave above middle C. Indicia 54, in the embodiment shown, are inscribed on the front panel above each of the twelve cylindrical knob switch actuators, corresponding with the notes of the twelve keys, e.g. A, A♯, B, C, C♯, etc. to thus relate the switch actuator to the keys directly below. It is understood, of course, that the indicia 54 may be positioned elsewhere than as shown, such as, for example, directly upon the cylindrical knobs, all within the teachings of this invention. The cylindrical knobs of the switch actuators 52 extend through holes in the front panel 43 and are connected to the shafts 55 extending horizontally and rearwardly to and through holes in the rear panel 44 in such a manner that they may be moved frontwardly and rearwardly, as will be more fully described hereinafter.

Since, as has been referred to above, the keys of a treble clef are most frequently used to produce the melody or root notes of a musical combination, the cylindrical knob switch actuators 52 may be considered as, and referred to hereinafter as, root note switch actuators.

The upper row of switch actuators 53, in the embodiment shown, consists of eleven shafts 57 protruding forwardly from and through holes in the front panel 43, each shaft having a rectangular knob secured at its forward end. These switch actuators are utilized to select the type of chord, e.g. Major, Minor, Augmented, Diminished, etc. which it is desired to have indicated on the indicator light assembly 14 in accordance with the teachings of this invention, and may therefore be considered as, and referred to hereinafter as, chord type switch actuators. And, as has been pointed out hereinabove, since there are as many as ten to fifteen commonly used chords, it is to be understood that there may be any number of chord type switch actuators provided in accordance with the teachings of this invention, although eleven are shown in the embodiment illustrated. Indicia 56, indicating the types of chords selectable, are shown as inscribed on the front panel above each of the eleven chord type switch actuators. These indicia may, of course, be positioned elsewhere, such as, for example, directly upon the rectangular knobs.

The shafts 57 of the chord type switch actuators 53, extend horizontally and rearwardly through holes in the front and rear panels 43 and 44 in such a manner that they may be moved frontwardly and rearwardly, as will be more fully described hereinafter.

By manipulation of the chord type switch actuators 53 and the root note switch actuators 52, it can be seen that a music student or a musician, may select the type chord he wishes to have indicated upon the indicator light assembly 14, corresponding to a melody or root note he may select, and will thus be shown the notes of a chord to be played in the bass clef which will be harmonious with a melody note played in the treble clef.

Figure 2A:
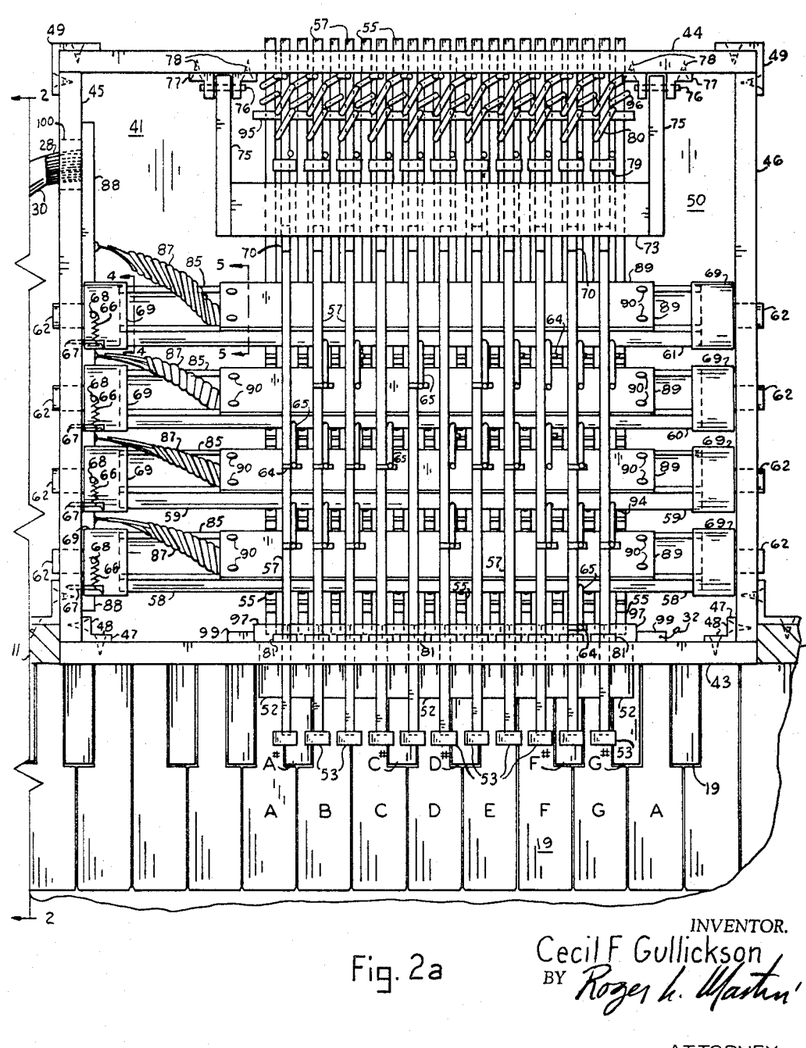
FIG. 2a is a similar top view of the switching mechanism showing its relation to the keys of a treble octave.
Figure 3:
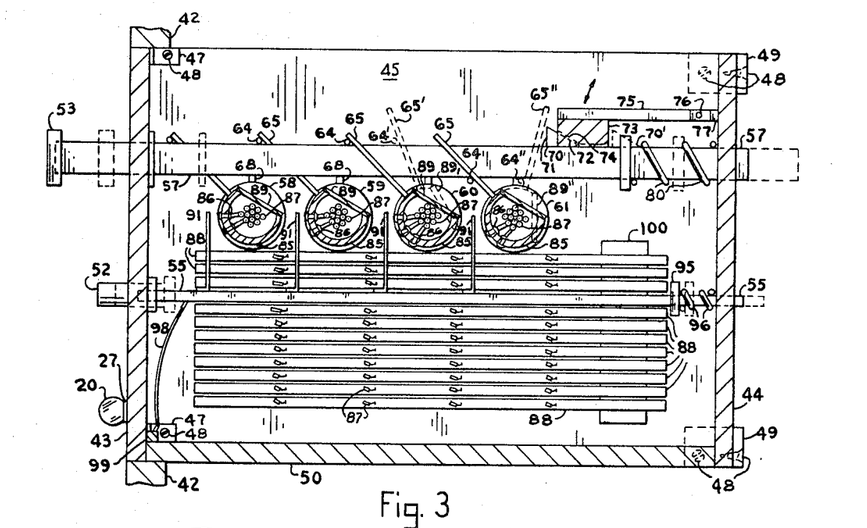

Referring now to the internal structure of the switch mechanism 15 as shown more particularly in FIGS. 2a and 3 there are provided four switch contact carrying rotors designated by the numerals 58, 59, 60 and 61 in the illustrated embodiment. These rotors are positioned horizontally parallel to the front panel 43 and the back panel 44 of the switch mechanism housing 41, and they extend from side wall panel 45 to side wall panel 46. In the embodiment shown, these rotors are supported in holes in the side wall panel 45 and 46 by small diameter extensions 62 of adaptors 69, attached to each end of each rotor, and which protrude through the holes in the side wall panels thus serving as shafts upon which the rotors may be rotated, as shown more particularly in FIG. 4a.

Each rotor is provided with means whereby rearwardly motion of one of the chord selector shafts 57 will rotate the rotor from its normal or first position to a second or third position. In the embodiment shown, these means consist of pins 64 secured to the shafts 57 in a position thereupon as to engage arms 65 extending outwardly from said rotors. The pins 64 are positioned on the shafts 57, and the arms 65 on the rotors 58, 59, 60 and 61, in such a manner that rearward motion of each of the eleven shafts 57 illustrated in this embodiment results in the rotation of one or more of the four rotors 58, 59, 60 and 61 from the first position to the second or third position, thus resulting in a different combination of rotor positions for each of the chord type selector shafts 57. For example, in the embodiment shown, when the rectangular knob switch actuator 53 representing the Major chord (i.e. the switch actuator in the upper horizontal row and closest to the side wall panel 45) is manipulated to move rearwardly, the two pins 64 secured on the shaft 57 for this switch actuator will engage the two arms 65 protruding from the rotors 59 and 60 respectively, thus causing these rotors to be rotated from their normal or first position to their second position. Since there are no pins 64 on the Major chord shaft 57 positioned such as to rotate rotors 58 and 61 (and no arms 65 on these rotors positioned such as to be engaged by pins of this Major chord shaft), these two rotors will remain in their normal or first position when this chord type switch actuator is manipulated. Similarly, in the embodiment shown, where the chord type switch actuator that is tenth from the left, and corresponds to the Ninth chord, as shown by the indicia 56, is moved rearwardly, the four pins 64 on the shaft 57 of this actuator will engage the four arms 65 protruding from the four rotors 58, 59, 60 and 61 and positioned to be so engaged, thus causing each of these rotors to be rotated from their normal position to another position.

In accordance with the teachings of this invention, certain of the rotors have three positions and must be rotated from their normal or first position to a second or third position to provide the desired type of chord. For this purpose, pins 64 may be positioned either on top of the shaft 57, wherein rearward motion thereof results in arms 65, and therefore the rotors, being rotated through a relatively small arc (30°), or the pins 64 may be positioned on the bottom of the shaft, rearward motion of the shaft thus resulting in the arms 65, and therefore the rotors, being rotated through a relatively large arc (60°), as more particularly shown in FIG. 3. In that figure rotors 60 and 61 are illustrated as being positioned in their first or normal position, with pins 64 and arms 65 and the major components of the rotors shown by solid lines. However, dotted lines are used to show the same components after the rotors have been rotated to other positions. More specifically, the dotted lines 64′, 65′ and 89′ show the location of these elements after rotor 60 has been rotated to its second position, while dotted lines 64″, 65″ and 89″ show these elements after rotor 61 has been rotated to its third position. It should be understood that in this manner, by proper positioning of pins 64 on each of the shafts 57, in relation to arms 65 on each of the four rotors, each of the rotors may, as desired, be rotated from their normal or first position to a second or to a third position.

Figure 4:
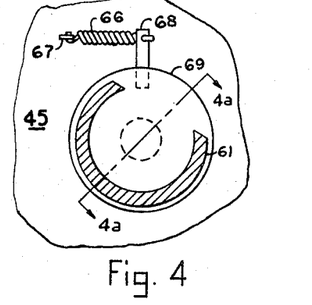
Figure 4A:
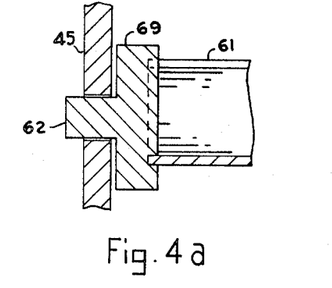
FIG. 4a is a section view through the end of the rotor shown in FIG. 4 and adjacent wall structure, the view being taken along the lines 4a—4a thereof.

The rotors are normally retained in their first position by means of tension springs 66 which are fastened at one end to screw elements 67 fixed in the side wall panel 45, and at the other end to radially extending pegs 68 that are press fit in holes extending radially from adaptors 69 secured to each rotor, as shown in detail in FIG. 4. In order, however, to retain the rotors in a second position or third position to which they have been rotated in the manner described above, each chord type selector shaft 57 is provided with a latch 70 triangularly shaped in cross section having a vertical face 71 and a sloping face 72, the latch on each shaft being positioned equidistant rearwardly, from the front end of the shaft. Positioned immediately above the latch 70 is a horizontal bar 73, rectangularly shaped in cross section but having a sloping face 74. This horizontal bar 73 is secured to overhead pieces 75 which are pivotally mounted by pins 76 in L-shaped supports 77 secured to the rear panel 44 by screws designated at 78, as shown in FIGS. 2a and 3. In operation, horizontal bar 73 is normally supported by its sloping face 74 abutting the sloping faces 72 of latch 70, but rearward movement of any of the chord type actuator shafts 57 results in the horizontal bar being raised until latch 70 passes beyond this bar to the position shown as 70′ whereupon it drops into its normal position. Each shaft 57 has secured thereto, rearwardly offset from the inner face of the rear panel 44, a sleeve 79. A compression spring 80 surrounds the shaft between the sleeve and the inner face of the rear panel so that the shaft is constantly being urged in a forward direction by the spring. Thus, when the latch 70 on any one of the shafts 57 has passed rearwardly of the horizontal bar 73, and that bar has returned to its normal position, the vertical face of the latch is forced forwardly by the compression spring 80 when the rearward pressure on the chord type switch actuator is released, until this face abuts the rear face of the horizontal bar 73, thus preventing the return of the shaft 57, and the rotors which have been rotated by this shaft, to their normal positions. Rearward motion of any other shaft 57 results in again lifting the horizontal bar, thus releasing the latch 70 and the shaft 57 previously secured, to result in these returning to their normal positions through the action of compression spring 80, and to result in the rotors previously retained in their second or third positions returning to their normal or first position by the action of tension springs 66. Forward movement of the shafts beyond their normal position is stopped by means of additional sleeves 81 fixed to the shafts at the inner face of the front panel 43.

In the embodiment of this invention herein described, the shaft 57 is preferably rectangular in cross section in order to facilitate the mounting thereupon of various components such as the pins 64 and the sleeves 79 and 81. To prevent rotation of the shafts, collars (not shown), having rectangular openings are positioned in the holes in the rear panel 44 through which these shafts pass, as heretofore described.

Figure 5:
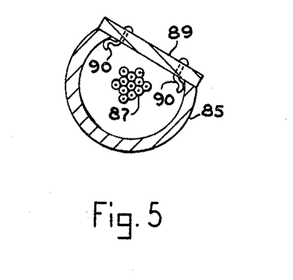
FIG. 5 is a vertical section view through the same rotor shown in FIG. 4 and as taken along the lines 5—5 of FIG. 2a to show the arrangement of certain clips involved in releasably securing one component to another component of the rotor.

Structurally, spanning the distance between the side walls 45 and 46 of the switching mechanism, each rotor 58, 59, 60 and 61 has an elongated hollow component 85 on which is mounted at each end adaptors 69 which serve as shafts on which the rotor may be rotated. This hollow component 85 is C-shaped in cross section (see FIG. 5) and serves as the mounting piece and carrier for the switch contacts 86. It also serves in housing the electrical lead wires 87 (shown twisted as they emerge therefrom) that interconnect the rotor contacts 86 and a series of twelve bus bars 88 that are mounted on side wall 45. Each rotor is equipped with an elongated flat rectangular member 89 that, in the assembled rotor, covers most of the opening into the hollow portion thereof. These cover members are provided with metal spring type clips 90 that engage the side wall of the hollow component and thus hold the cover in place in the assembly while nevertheless permitting the cover members to be easily removed for access to the wires 87 and switch contacts 86. These cover members are somewhat shorter than the C-shaped hollow components 85 to permit the twisted ends of the electrical lead wires 87 to pass to their connections with the bus bars 88.

The switch contacts 86 on each rotor are arranged in longitudinally extending parallel rows along the perimeter of the hollow components 85 thereof. These rows are angularly spaced apart (approximately 30° in the embodiment shown) with respect to the access of rotation of the rotor. Each row has twelve of the switch contacts 86 spaced apart at such distance and positioned such that each of the twelve contacts is directly above one of the twelve root note selector shafts 55. Mounted upon each of these shafts 55 are four vertical standing finger contacts 91 so positioned as to make electrical contact with the switch contacts 86 of each of the rotors upon suitable rotation of these rotors and actuation of the associated root note switch actuator 52, i.e. through rearwardly motion of the associated root note selector shaft 55.

Figure 6:
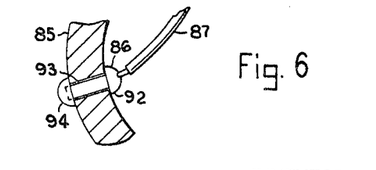
FIG. 6 is an enlarged vertical section through a fragment of a rotor to show the means used in mounting the contracts on the rotor.

Each switch contact 86 is mounted on the elongated hollow component 85 as shown in FIG. 6 and has a headed element 92 which is provided with a suitable shank 93 that extends through a hole in the hollow component 85. The end of the shank 93 fits in a socket of a cap 94 at the exterior face of the rotor, and the shank is barbed so that secure press fit is obtained when the contact is assembled. Each of the twelve switch contacts in each row on each of the four rotors is electrically connected with one of the electrical lead wires 87 by electrical connection with the headed element 92.

Reference has been made above to the necessity for effecting rotation of the rotors from their first or normal position to a second or third position in order to obtain certain types of chords, and to the several rows of switch contacts on each rotor. In the embodiment herein described and illustrated, rotors 58 and 59 contain only two rows of switch contacts and need be rotated only from their first or normal position to a second position. However rotors 60 and 61 are additionally provided with a row of switch contacts in a third position, and with the means to rotate these rotors to the additional third position, as hereinabove described. Furthermore, in the described and illustrated embodiment, rotor 61 is shown as not requiring a row of switch contacts in the first or normal position and having switch contact rows only in the second or third position. The reasons for such arrangements are more clearly understood by reference to Table No. I and the description which follows this table.

As has been previously indicated the root note selector shafts 55 which are connected to the cylindrical knobs

TABLE NO. I

| Chord type | Indicia | 1st Rotor | | | 2nd Rotor | | | 3rd Rotor | | | 4th Rotor | | | 5th Rotor | | |
|---|---|---|---|---|---|---|---|---|---|---|---|---|---|---|---|---|
| | | Pos. #1 | Pos. #3 | Pos. #2 | Pos. #1 | Pos. #2 | Pos. #3 | Pos. #1 | Pos. #2 | Pos. #3 | Pos. #2 | Pos. #3 | Pos. #1 | Pos. #1 | Pos. #2 | Pos. #3 |
| | | | | | | | | Scale note steps | | | | | | | | |
| | | I | I# | II | II# | III | IV | IV# | V | V# | VI | VI# | VII | VIII | VIII# | IX |
| Major | Maj | X | | | | X | | | X | | | | | | | |
| Major 6th | Maj. 6th | X | | | | X | | | X | | X | | | | | |
| Common 7th | Com. 7th | X | | | | X | | | X | | | | X | | | |
| Minor | Min | X | | | X | | | | X | | | | | | | |
| Diminished 7th | Dim. 7th | X | | | X | | | X | | | X | | | | | |
| Augmented | Aug | X | | | | X | | | | X | | | | | | |
| Minor 6th | Min. 6th | X | | | X | | | | X | | X | | | | | |
| Minor 7th | Min. 7th | X | | | X | | | | X | | | | X | | | |
| Augmented 7th | Aug. 7th | X | | | | X | | | | X | | X | | | | |
| Common 9th | Com. 9th | | | X | | X | | | X | | | | X | | | |
| Common 7th with Flatted 5th | Com. 7th with Flatted 5th | X | | | | X | | X | | | | | X | | | |
| Major 7th | Maj. 7th | X | | | | X | | | X | | | | | X | | |
| Flatted 9th | Com. 7th–9th | X | | | X | | | | X | | | | X | | X | |
| Major 9th | Maj. 7th+9th | X | | | X | | | | X | | | | X | | | X |
| Augmented 9th | Com. 9th +5th | X | | | X | | | | | X | | X | | | | X |

In Table No. I, fifteen various types of chords are represented by combinations of the twelve notes of any scale (and three additional notes above the scale octave), represented as scale note steps I, I#, II, II#, III, IV, etc. Only eleven of these types of chords (those above the solid line) have been utilized to exemplify the invention in the description and drawings of this application, but it is to be understood that the additional types of chords, for example various five-note chords, may be provided by using additional rotors (such as e.g. the fifth rotor shown in the table) and/or by using additional rows of switch contacts (such as, e.g., those for Position No. 1 on the fourth rotor as shown in the table). From this table, it will also be seen that a third row of switch contacts is not needed on certain rotors (e.g. in Position No. 3 on the first rotor, and Position No. 1 on the fourth rotor) unless it is desired to obtain indications of chord types other than the eleven types used to illustrate this invention. It will also be apparent that the various positions of the rotors may be chosen as will be most convenient structurally, as for example, in the embodiment described, omitting use of Position No. 3 on the first rotor (since no chord types use scale note step I#) and utilizing Positions 2 and 3 of the fourth rotor for scale note steps VI and VI#, thus simplifying the structure for rotation of the rotors. It must be understood, however, that where it is desired to employ the teachings of this invention for chord types other than the eleven types of the described embodiment, there must also be added to the structure illustrated additional components, such as chord type switch actuators 53, etc.

Further with respect to Table No. I, as will be understood by those skilled in the art, the scale note steps shown therein as I, I#, II, II#, III, IV, etc. may be expressed in terms of the letter designations for each note, depending upon the name of the scale or root comprising these notes. For example, the scale note steps represented by I through VII in Table No. I, for the C major scale would be C, C#, D, D#, E, F, F#, G, G#, A, A# and B. Similarly, for the F major scale these notes I, I#, II, II#, etc. would be F, F#, G, G#, A, A#, B, C, C#, D, D# and E respectively while for the scale of G#, these notes would be G#, A, A#, B, C, C#, D, D#, E, F, F# and G respectively.

Figure 7A:
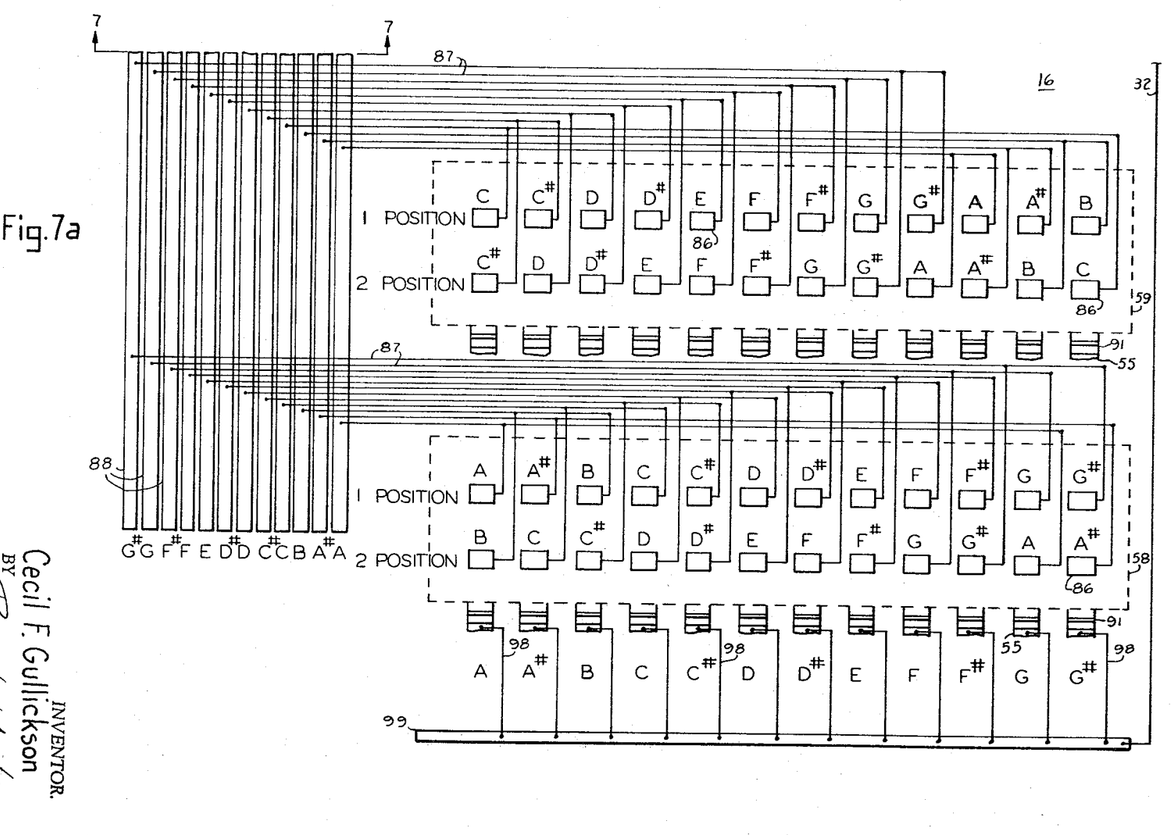

Reference to FIGS. 7 and 7a in conjunction with Table No. I will disclose the manner in which the notes comprising the various types of chords are electrically selected by the switch mechanism 15 through manipulation of the root note switch actuators 52 and the chord type switch actuators 53.

As has been previously indicated the root note selector shafts 55 which are connected to the cylindrical knobs of the switch actuators 52, in the embodiment shown, extend rearwardly through holes in the rear panel 44 and may be moved frontwardly and rearwardly. Similar to shafts 57, these shafts are preferably rectangular in cross section in order to facilitate the mounting thereupon of various components. Rotation thereof is prevented by means of collars (not shown) having rectangular openings and positioned in the holes in the rear panel 44. Each shaft 55 has secured thereto, inwardly offset from the inner face of the rear panel 44, a sleeve 95. A compression spring 96 surrounds the shaft between the sleeve and the inner face of the rear panel so that the shaft is constantly being urged in a forward direction by the spring. Forward motion of the shaft 55 beyond its normal position is precluded by means of the collar 97 secured to the cylindrical knob 52 at the inner face of the front panel 43. In the embodiment shown, this collar 97 is an integral part of the cylindrical knob 52 to which the shaft 55 is fastened.

As has been indicated, the vertical standing finger contacts 91 mounted on the shafts 55, upon actuation of root note switch actuators 52, make electrical contact with cap 94 of the switch contacts 86. Thus the shafts 55 form part of the electrical circuit and must therefore be made of conductive material such as brass, etc. In order to electrically connect each of the twelve shafts, corresponding with the twelve root notes, with the power source 31, an electrical lead 98 is made between each shaft and a bus bar 99 which, in the embodiment shown, is positioned along the inner face of the front panel 43 at the lower edge thereof adjacent to the bottom wall 50 of the housing 41. The bus bar 99 has an electrical lead 32 soldered thereto at one end thereof, which lead is connected to the power source 31 as described hereinabove, and as it is shown in the circuit diagram of FIGS. 7 and 7a.

Further reference to the circuit diagram of FIGS. 7 and 7a will indicate the manner in which the switch mechanism 15 functions electrically to provide power from the power source 31 to the sockets 27 of the indicator light assembly 14 in accordance with the teachings of this invention. From the power source 31, electric current is brought by the electrical lead 32 to the bus bar 99 and then by electrical leads 98 to each of the root note selector shafts 55 upon which are mounted the vertical standing finger contacts 91. Upon manipulation of any one of the twelve root note switch actuators 52, the finger contacts 91 upon the shaft 55 associated with that root note actuator make direct contact with switch contacts 86 on rotors 58, 59, 60 and 61 providing the rotors are in such a position as to permit such contact to be made, this being determined by prior operation of the chord type switch actuators 53 as has been heretofore explained. From the switch contacts 86 electric current is conducted by the electrical lead wires 87 within the hollow component 85 of the rotors to the bus bars 88, which in turn are connected through electrical leads 28 to the end caps of sockets 27 which hold the bulbs 20. The sides of sockets 27 are secured to the bus bar 26 which in turn is connected by means of the electrical lead 29 to the other side of the power source 31.

It has previously been indicated that the electrical leads 28 are brought out of the indicator light assembly 14 in the form of a cable 30 leading to the switch mechanism structure 15; this cable is lead into the switch mechanism structure through an opening 100 in the side wall 45 so positioned as to facilitate the electrical connection of the leads 28 to the bus bars 88.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A musical chord indicating device which comprises an indicator light assembly, a switching mechanism having a plurality of selectively actuatable chord type selectors and a plurality of selectively actuatable root selectors, and electrical circuitry connecting said indicator light assembly with said switching mechanism whereby said indicator light assembly indicates the notes composing the musical chords of any selected type harmoniously related to each of the twelve root notes of a musical scale when various combinations of said chord type and root selectors are selectively actuated.

2. A music teaching aid which includes means for indicating the notes composing a selected type of a musical chord harmoniously related to the root notes of a musical scale, said means comprising, in combination, an indicator light assembly and a switching mechanism having a plurality of selectively actuatable chord type selector means, a plurality of selectively actuatable root selector means, and electrical circuitry connecting with said indicator light assembly.

3. The combination in accord with claim 2 wherein said indicator light assembly comprises a plurality of lights corresponding with the notes of a bass octave, connected in said circuitry whereby concurrent actuation of certain of said chord type selector means and certain of said root selector means will light certain of said lights to indicate thereby a combination of said notes having harmonious relation to the selected root notes.

4. The combination in accord with claim 2 wherein said chord type selector means comprises a plurality of shafts having pins positioned thereupon, a plurality of rotors having thereupon arms positioned to be engageable by certain of said pins, said rotors further having switch contacts positioned thereupon to make electrical contact with certain of said root selector means thereby indicating a combination of notes on said indicator light assembly having harmonious relation to the selected root notes.

5. The combination in accord with claim 2 wherein said root selector means comprises a plurality of shafts having secured thereto finger contacts positioned to make electrical contact with certain of said chord type selector means thereby indicating on said indicator light assembly a combination of notes having harmonious relation to the selected root notes.

6. The combination in accord with claim 2 wherein said electrical circuitry comprises a power source, a plurality of finger contacts associated with said root selector means, a plurality of switch contacts associated with said chord type selector means, said switch contacts positioned to make electrical contact with said finger contacts thereby indicating on said indicator light assembly a combination of notes having harmonious relation to the selected root notes.

7. In combination with a musical instrument having a manual that includes a bass octave having keys that are depressible in playing chord selections thereon, a chord indicating device including lights respectively associated with an in indicating relation to the keys in said bass octave, a power source, and circuitry interconnecting said lights and said source including a switching mechanism operable to energize the proper combination of lights to indicate a chord selection to be played in said octave, said switching mechanism having selectively actuatable root selector means comprising actuatable means associated with the root of said chord selection and which is actuatable to complete electrical circuits to energize said proper combination of lights, and selectively actuatable chord type selector means including means associated with the chord type of said chord selection and which is actuatable to select the electrical circuits energizable by said means.

8. The combination of a musical instrument having a manual that includes depressible keys related to notes in a scale, and a chord indicating device comprising a light assembly having lights respectively located in indicating relation to said keys and being energizable to indicate thereupon the related notes of a chord selection, circuitry connected to said lights including a switch mechanism for selectively energizing the proper combination of lights to indicate a chord selection, said switch mechanism having a first set of actuators selectively actuatable to establish the type of chord indicated by said lights, and a second set of actuators selectively actuatable to establish the root note of the chord type indicated by said lights.

9. The combination in accord with claim 8 wherein each actuator of the first set is adapted upon actuation to select a group of circuits selectively energizable to light a proper combination of lights indicating a chord selection having a predetermined root note, and wherein each actuator of the second set is associated with a different note in said scale and is adapted upon actuation to energize one of the circuits of said group.

10. A musical chord indicating device which comprises an indicator light assembly having a plurality of lights corresponding with the notes of a bass octave, and a switching mechanism having selectively actuatable chord type selectors and selectively actuatable root selectors, said chord type selectors comprising a plurality of shafts having pins selectively positioned thereupon which, when said chord type selectors are actuated, will engage arms selectively positioned on a plurality of rotors to thereby selectively position said rotors such that switch contacts contained thereupon will be selectively positioned, said root selectors comprising a plurality of shafts having finger contacts secured thereto, which, when said root selectors are actuated, will selectively make electrical contact with the switch contacts on said rotors, whereby selective electrical circuitry will be established to thereby light, by means of a power source in said circuitry, certain of said plurality of lights to indicate thereby the combination of notes of said bass octave which bear any one of a plurality of harmonious relationships to any one of a plurality of root notes of a treble clef selected by said actuation of one of said root selectors.

11. A musical chord indicating device which comprises an indicator light assembly, a switching mechanism, and electrical circuitry connecting said indicator light assembly with said switching mechanism, said switching mechanism having a plurality of switch actuators each corresponding to a common type of musical chords, a plurality of switch actuators each corresponding to a root note of a musical scale, and switches associated with each actuator whereby selection of any one of said chord type switch actuators and any one of said root note switch actuators interconnects said switches and thereby indicates upon said indicator light assembly the notes which compose any one of said selected types of musical chords and which are harmoniously related to any one of said selected root notes.

References Cited

UNITED STATES PATENTS 1,324,276  12/1919  Schantz ______________ 84—478

RICHARD B. WILKINSON, *Primary Examiner.*

GARY M. POLUMBUS, *Assistant Examiner.*